United States Patent [19]
Zahid

[11] 3,930,521
[45] Jan. 6, 1976

[54] GAS CHARGING VALVE FOR ACCUMULATOR

[75] Inventor: Abduz Zahid, Los Angeles, Calif.

[73] Assignee: Greer Hydraulics, Inc., Los Angeles, Calif.

[22] Filed: Sept. 5, 1974

[21] Appl. No.: 503,397

[52] U.S. Cl. ............... 138/31; 138/30; 137/516.27; 137/516.29; 137/541
[51] Int. Cl.² ......................................... F16L 55/04
[58] Field of Search ... 138/30, 31; 137/541, 516.27, 137/516.29

[56] References Cited
UNITED STATES PATENTS

| | | | |
|---|---|---|---|
| 3,082,793 | 3/1963 | Sugimura | 138/30 |
| 3,465,786 | 9/1969 | Spisak | 137/516.27 |
| 3,756,273 | 9/1973 | Hengesbach | 137/541 X |

*Primary Examiner*—Richard E. Aegerter
*Assistant Examiner*—James E. Bryant, III
*Attorney, Agent, or Firm*—Arthur B. Colvin

[57] ABSTRACT

This invention relates to the art of pressure vessels and more particularly to a valve assembly for use in a pressure vessel of the type having a rigid container with a deformable bladder therein, dividing the container into two variable volume chambers, one adapted to receive gas under pressure and the other to receive liquid under pressure.

The valve assembly which is screwed into a port in communication with the gas chamber includes a slidably mounted stem having a resilient valve member at one end normally urged to seat on the beveled inner end of an axial bore in the valve assembly in a first seating position of the valve member, and urged further into said beveled inner end when the bladder is charged with gas under pressure in a second seating position of the valve member. The inward movement of the valve member is limited by a stop carried by the stem. When the liquid chamber is charged, if the bladder should abut against the resilient valve member, no extrusion of the bladder would occur.

6 Claims, 6 Drawing Figures

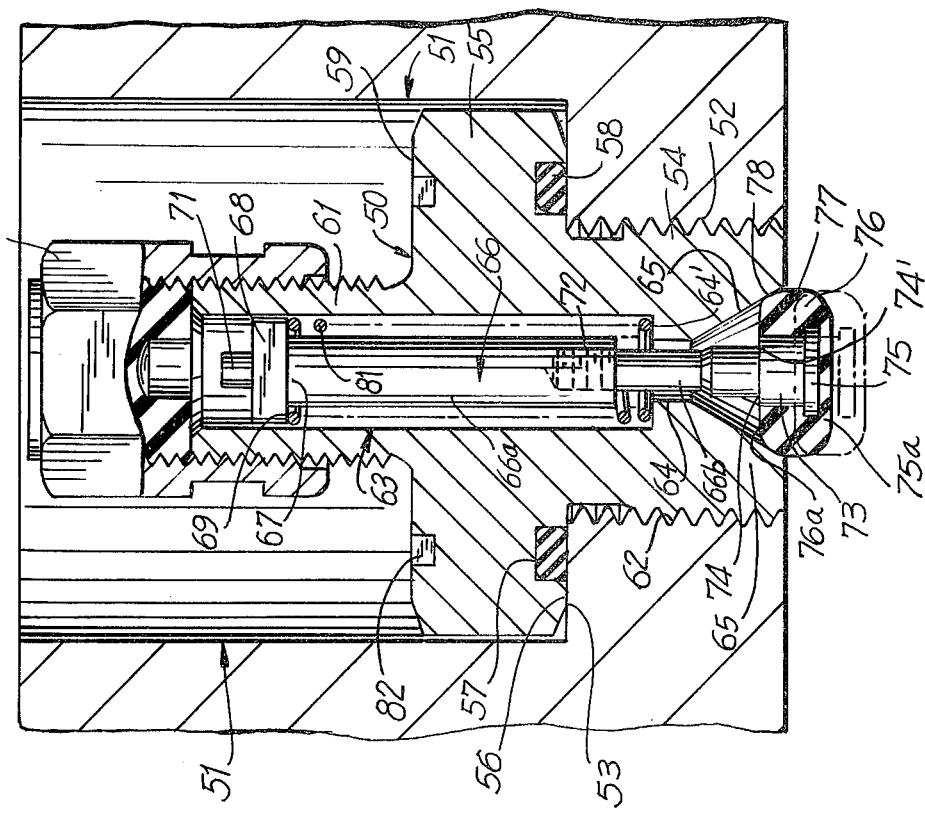
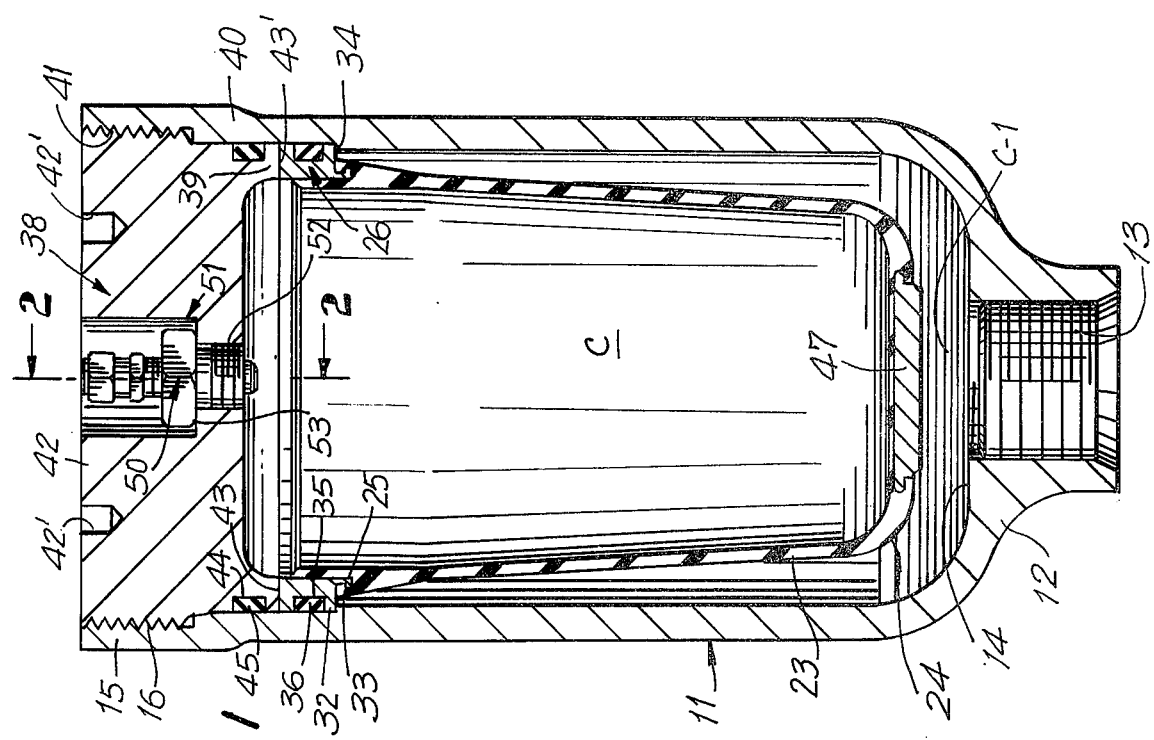

GAS CHARGING VALVE FOR ACCUMULATOR

As conducive to an understanding of the invention, it is to be noted that where a pressure vessel of the above type is charged with gas under pressure through a conventional gas valve such as a Schrader valve, and the inner end of the bore in which the Schrader valve is positioned is exposed, when the liquid chamber is charged with fluid under pressure, causing the bladder to deform and extrude into said gas port, cutting of the bladder may occur with resultant failure of the unit.

It is accordingly among the objects of the invention to provide a gas charging valve assembly which may be incorporated into a single housing and which has relatively few parts which may readily be fabricated at low cost, and which will provide a resilient closure at the inner end of the gas charging bore against which the bladder may abut, thereby preventing extrusion of the bladder into the gas charging bore with resultant cutting of the bladder and failure of the unit.

According to the invention these objects are accomplished by the arrangement and combination of elements hereinafter described and more particularly recited in the claims.

In the accompanying drawings in which are shown one of various possible embodiments of the several features of the invention:

FIG. 1 is a perspective view of a pressure vessel incorporating the invention;

FIG. 2 is a sectional longitudinal view on an enlarged scale taken along line 2—2 of FIG. 1, showing the valve member in closed but unstressed condition;

Figure 3:
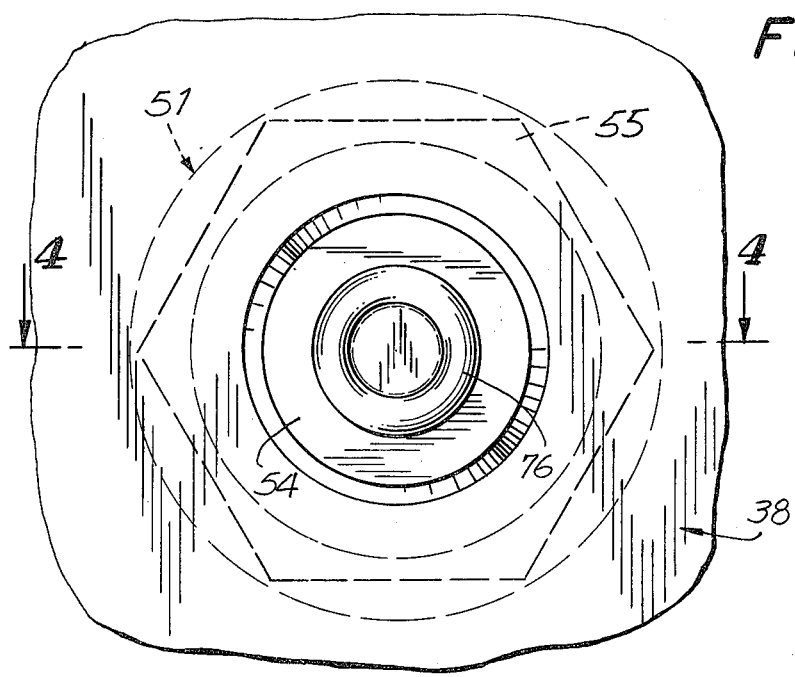
FIG. 3 is a transverse sectional view with parts broken away taken along line 3—3 of FIG. 4.

Referring now to the drawings, the pressure vessel illustratively comprises a substantially cylindrical container 11 of rigid material, such as steel or aluminum, capable of withstanding the pressure to which it is to be subjected in use.

The container has one end closed as at 12 and such closed end has an axial port 13, the inner end 14 of which defines a valve seat.

The mouth 15 of the container is cylindrical as shown and the inner surface of the container adjacent the mouth 15 is threaded as at 16.

Positioned in container 11, is a deformable partition illustratively in the form of an elongated bladder 23 of rubber or similar material having like characteristics which divides the container 11 into a gas chamber C, and a liquid chamber C-1. The bladder 23 is closed at one end as at 24, and the mouth 25 of the bladder which is of greater thickness than the remaining portion of the bladder is secured as by molding to an annular supporting member 26 of rigid material, preferably of steel. By reason of the molding of the bladder 23 to the annular supporting member 26, the bladder 23 will be securely bonded to such supporting member 26.

It is to be noted that the transverse width of the annular supporting member is greater than that of the thickened rim 25 of the bladder, so that as clearly shown in FIG. 1, the outer periphery 32 of the annular supporting member 26 will extend laterally outwardly of the outer periphery 33 of the thickened rim 25.

As is clearly shown in FIG. 1 the inner diameter of the container is reduced to define an annular shoulder 34 which forms a seat for the outer periphery 32 of the annular supporting member 26 so that the bladder 23 will be dependably retained in desired position in the container.

The annular supporting member 26 has an annular groove 35 in its outer periphery in which an O-ring 36 is positioned, the function of the O-ring being to provide a seal.

In order to retain the annular supporting member 26 and bladder 23 in position, a cylindrical cover member 38 is provided. As is clearly shown in the drawings, the cover member is substantially cup-shaped with its side wall or skirt 39 of outer diameter just slightly less than the diameter of the wall portion 40 of the container so that the side wall 39 may be readily positioned in the container.

The cover member 38 adjacent its outer surface is of slightly enlarged diameter as at 41, and is externally threaded so that it may be screwed into threaded mouth 15 of the container by means of a spanner wrench (not shown) applied to conventional bores 42' in the top surface 42 of the cover member 38.

As is clearly shown in the drawings, when the cover member is screwed into the container, with the top surface 42 of the cover member flush with the outer end 15 of the container, the inner end 43 of the side wall 39 of the cover member will abut against the top surface 43' of the annular supporting member 26 to retain the latter on the annular shoulder 34.

The outer periphery of the side wall 39 of the cover member, has an annular groove 44 in which an O-ring 45 is positioned to define a seal between the side wall 39 and the inner surface of the container.

Mounted on the closed end 24 of the bladder 23 and axially positioned with respect thereto is a valve member 47 illustratively in the form of a button, preferably formed from steel or aluminum. The valve member is designed to abut against seat 14 to close the port 13 when the gas chamber C is charged with gas under pressure, as will be hereinafter described.

According to the invention the cover member 38 has an axial bore 51 therethrough of reduced diameter at its inner end, as at 52, defining an annular shoulder 53.

Positioned in the axial bore 51 is a gas valve assembly 50. The gas valve assembly, as is clearly shown in FIG. 2 for example, comprises a rigid cylindrical member preferably of steel having a cylindrical portion 54 at its inner end depending from integrally formed hub configuration 55, illustratively hexagonal in shape. The inner surface 56 of hub 55 has an annular recess or groove 57 in which an O-ring 58 is positioned.

Rising from the top surface 59 of hub portion 55 is a cylindrical portion 61 axially aligned with cylindrical portion 54 and illustratively of smaller diameter than the latter.

The cylindrical portion 54 is externally threaded as at 62 so that it may be screwed into the correspondingly internally threaded portion of the reduced diameter portion 52 in the manner hereinafter to be described.

As is clearly shown the valve assembly 50 has an axial bore 63 therethrough which is of reduced diameter as at 64 adjacent its lower end defining an annular shoulder 64' and then flares outwardly as at 65 to define a beveled seat.

Positioned in the bore 63 is a valve stem 66 which has a body portion 66a and a mounting portion 66b, the stem 66 being of a diameter substantially less than that of bore 63.

Secured to the outer end 67 of stem 66 is a transversely extending retaining bar 68 of length greater than the diameter of stem 66 so as to define a retaining shoulder 69. An actuating pin 71 extends axially outwardly from the center of cross bar 68.

The inner end of the body portion 66a of stem 66 has an axial recess 72 therein which is internally threaded as shown. The mounting portion 66b comprises a pin having one end screwed into threaded recess 72. The outer cylindrical end 73 of mounting pin 66b is of enlarged diameter defining an annular stop shoulder 74 having a sharp periphery 74'. The end of enlarged diameter portion 73 has an enlarged diameter colar 75 integral therewith, and a valve member or disc 76 in the form of an annular bead of resilient material such as rubber is bonded to the end 73 of mounting pin 66b and the collar 75 which are completely embedded in the resilient valve disc 76. It is to be noted that the outer plane 76a of valve member 76 is aligned with the plane of shoulder 74.

As is clearly shown in FIG. 2, the valve member 76 has a rounded periphery 77 and is of diameter such that the periphery would normally be positioned slightly inwardly of the mouth or outer edge 78 of beveled seat 65 as shown in FIG. 2.

In order to retain the valve member 76 in its closed but relatively unstressed position shown in FIG. 2, which is the first seating position thereof, a coil spring 81 is provided encompassing the body portion 66a of stem 66 with one end of the coil spring abutting against the retaining shoulder 69 formed by cross bar 68 and the other end of the spring abutting against annular shoulder 64'.

As a result of the force exerted by such spring, the valve member 76 will be urged inwardly to the position shown in full lines in FIG. 2 which is the unstressed position of the valve member 76.

To complete the assembly, a cap 81 is provided which is internally threaded so that it may be screwed on the externally threaded end 61 of the valve assembly.

The valve assembly 50 according to the invention may readily be mounted in the cover member 38 and also readily removable therefrom.

To mount the valve assembly it is merely necessary to utilize a socket wrench (not shown), the lower edge of which would engage the recesses 82 in the top surface 59 of the hub portion 55. When the socket wrench is rotated the end 54 would be screwed into threaded bore portion 52 until the inner surface 56 of the hub 55 abuts against shoulder 53 at which time the )-ring 58 would be compressed to define a seal.

To charge the pressure accumulator above described, the cap 81a is removed and a charging adaptor of conventional type (not shown) is screwed onto the outer end portion 61. The charging adaptor carries a conventional axial pin which presses against the pin 71, forcing the valve stem 66 inwardly into the container. As a result the valve member 76 will be moved away from the beveled seat 65, to the position shown in broken lines in FIG. 2.

As a result gas under pressure will be forced through bore 63, reduced bore portion 64 and beveled bore portion 65 into the gas chamber C defined by the bladder 23.

Figure 4:
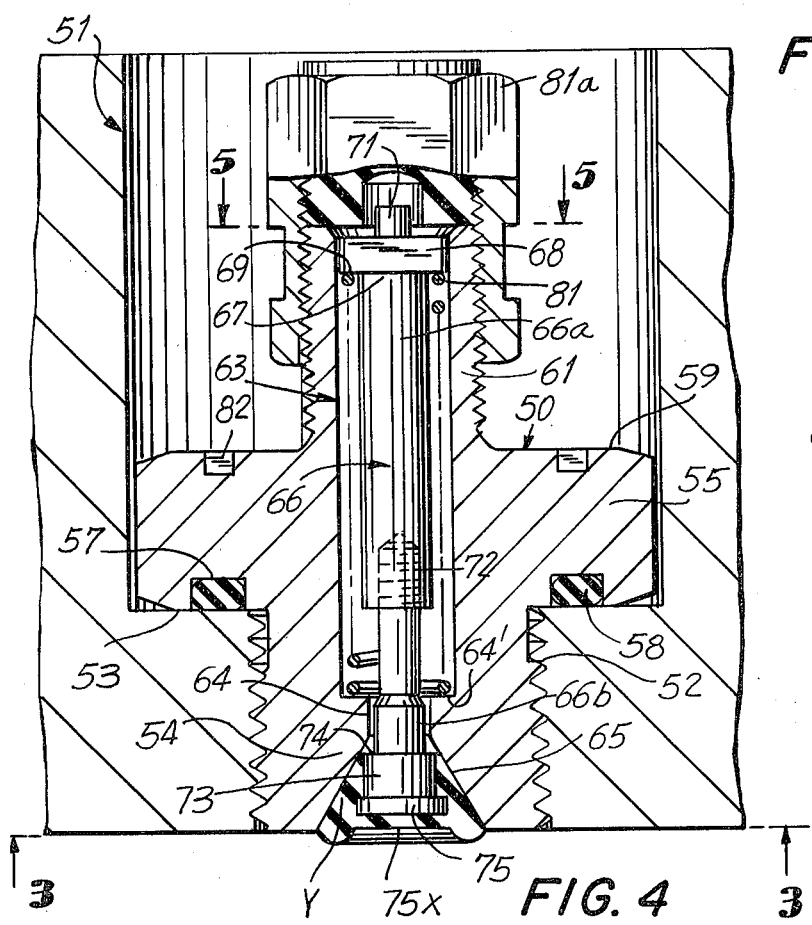
FIG. 4 is a transverse sectional view taken along the line 4—4 of FIG. 3 showing the valve member in closed stressed condition.
Figure 5:
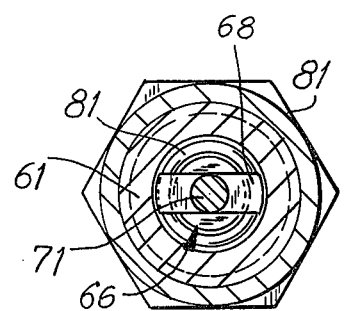
FIG. 5 is a detail transverse sectional view taken along line 5—5 of FIG. 4.

After the bladder 23 is charged, the charging adaptor is removed and the cap 81a screwed in place. As a result of the forces exerted by the coil spring 81 and the compressed gas in bladder 23 which will react against the inner surface 75a of valve member 76, the resilient valve member 76 will first move to the position shown in full lines in FIG. 2 and then will continue to move inwardly due to the force exerted by the gas under pressure in the charged bladder, to the position shown in FIG. 4. Due to the force exerted by the gas under pressure in the charged bladder 23, as is clearly shown in FIG. 4, the resilient valve member 76 will be deformed so that its outer periphery will substantially conform to the configuration of the beveled bore portion 65.

In addition it is to be noted that the valve stem 66 will move outwardly until the sharp periphery 74' of stop shoulder 74 abuts against the beveled wall portion 65, thus providing a metal to metal seal.

Due to the fact that the pressure in the bladder 23 reacting against the resilient valve member 76 is greater than the pressure in bore 63, the valve member 76 will define an O-ring seal at the junction between the edge 74' and the beveled wall 65, ensuring a highly dependable gas seal.

It is to be noted that since the surface 75a of the valve member is substantially flush with the adjacent inner surface of cylindrical portion 54 and the rubber material forming the valve member 76 is tightly pressed against the beveled seat 65 there will be no opening provided which would permit extrusion of the bladder 23 if the latter should fold across the inner end of the gas port when the liquid chamber C-1 is charged with oil under pressure.

In the embodiment shown in FIGS. 1-5, the valve assembly is part of a separate casing screwed into the gas port. In the embodiment shown in FIG. 6, the valve assembly is located directly in the gas port.

Figure 6:
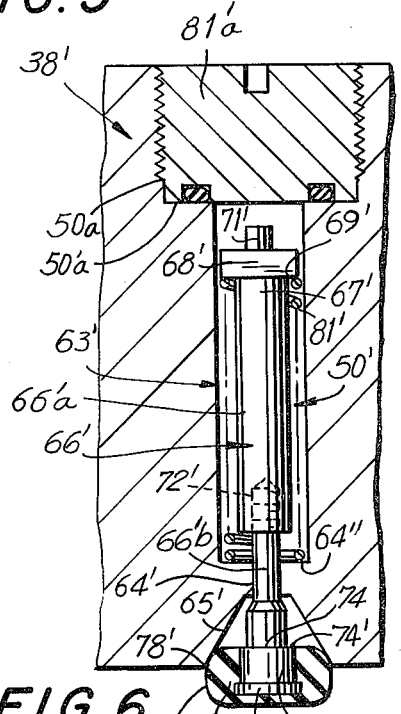
FIG. 6 is a detail view of another embodiment of the invention.

In view of the similarity of the embodiment shown in FIG. 6 to the embodiment of FIGS. 1-5, corresponding parts have the same reference numerals primed.

Referring to FIG. 6, the cover member 38' has an axial bore 63' therethrough of enlarged diameter at its outer end 50a defining an annular shoulder 50'a and of reduced diameter at its inner end as at 64' defining an annular shoulder 64''.

Positioned in bore 63' is a gas valve assembly 50' which comprises a valve stem 66' having a body portion 66'a and a mounting portion 66'b, the stem 66' being of diameter substantially less than that of bore 63'.

Secured to the outer end 67' of stem 66' is a transversely extending retaining bar 68' of length greater than the diameter of stem 66' so as to define a retaining shoulder 69'. An actuating pin 71' extends axially outwardly from the center of cross bar 68'.

The inner end of the body portion 66'a of stem 66' has an axial recess 72' therein which is internally threaded as shown. The mounting portion 66'b comprises a pin having one end screwed into threaded recess 72'. The outer cylindrical end 73' of mounting pin 66'b is of enlarged diameter defining an annular stop shoulder 74 having a sharp periphery 74'. The end of enlarged diameter portion 73' has an enlarged diameter collar 75' integral therewith, and a valve member or disc 76' in the form of an annular bead of resilient material such as rubber is bonded to the end 73' of mounting pin 66'b and the collar 75' which are completely embedded in the resilient valve disc 76'.

As is clearly shown in FIG. 6, the valve member 76' has a rounded periphery 77' and is of diameter such that the periphery would normally be positioned slightly inwardly of the mouth or outer edge 78' of beveled seat 65' as shown in FIG. 6.

In order to retain the valve member 78' in its closed but relatively unstressed position shown in FIG. 6, which is the first seating position thereof, a coil spring 81' is provided encompassing the body portion 66'a of stem 66' with one end of the coil spring abutting against the retaining shoulder 69' formed by cross bar 68' and the other end of the spring abutting against annular shoulder 64''.

As a result of the force exerted by such spring, the valve member 76' will be urged inwardly to the position shown in full lines in FIG. 6 which is the unstressed position of the valve member 76'.

To complete the assembly, a plug 81'a is provided which is internally threaded so that it may be screwed into the internally threaded end 50a of the cover 38'.

Since the operation of the valve assembly of FIG. 6 is identical to that of the embodiment of FIGS. 1–5, no further description is believed necessary.

Having thus described my invention, what I claim as new and desire to secure by letters patent of the United States is:

1. A pressure vessel comprising a container of rigid material having two ports, both axially aligned with said container, one of said ports defining a gas port and the other a liquid port, a partition intervening between said ports to define a variable volume gas chamber and a variable volume liquid chamber in communication with said gas port and liquid port, respectively, means to close said liquid port, means to charge said gas chamber with gas under pressure, said charging means comprising a valve assembly mounted in the gas port, said valve assembly comprising a bore having an inner end defining a valve seat, a valve stem slidably mounted in said bore, said stem being of dimensions such as to provide clearance for gas flow through said bore, said stem having an inner end, a valve disc of deformable resilient material mounted on said inner end of said stem, resilient means reacting against said stem to urge the latter outwardly to retain the outer surface of said valve disc against said seat in a first seating position, and means rigid with said stem adapted to abut against said valve seat when said valve disc is moved outwardly to a second seating position as a result of gas pressure in said gas chamber, to limit the outward movement of said valve disc.

2. The combination set forth in claim 1 in which the inner end of said bore is beveled to define said valve seat, said bore being of larger diameter at its inner end, said valve disc is an annular bead having a periphery which engages said larger diameter inner end of said beveled valve seat in the first seating position of said valve disc.

3. The combination set forth in claim 1 in which the inner end of said bore is beveled to define said valve seat, said valve seat being of larger diameter at its inner end and of smaller diameter at its outer end, the inner end of said valve stem extends into the valve seat and has a cylindrical portion of diameter greater than said smaller diameter outer end portion of said beveled seat, said stem having a cylindrical portion adjacent its inner end, said valve disc is an annular bead secured to said cylindrical portion of said stem, said bead having a periphery engaging said larger diameter portion of said beveled seat in the first seating position of said valve disc, said cylindrical portion of said stem engaging the smaller diameter outer end portion of said beveled seat in a second position of said valve disc, said bead being deformed into the beveled portion of said bore in the second seating position of said valve disc.

4. The combination set forth in claim 1 in which said bore has a reduced diameter portion near its inner end defining a shoulder, said stem has an outer end having an abutment, a coil spring encompassing said stem and reacting against said abutment and said shoulder, normally urging said stem outwardly to move said valve disc to its first seating position.

5. The combination set forth in claim 1 in which said gas port comprises an additional bore having an inner end of reduced diameter defining an annular shoulder, said reduced diameter end of said bore being internally threaded, said valve assembly comprises a casing of rigid material having said first named bore extending axially therethrough, said valve assembly having a transversely extending hub with externally threaded cylindrical portions extending axially from both sides thereof, one of said cylindrical portions being screwed into the reduced diameter bore portion, said first named bore extending through said cylindrical portions of said hub.

6. The combination set forth in claim 5 in which said hub defines opposed surfaces, the surface of said hub adjacent the cylindrical portion screwed into the reduced diameter bore portion has an annular recess in which an O-ring is positioned, said O-ring being compressed against said annular shoulder when the cylindrical portion is tightened to define a seal.

* * * * *